(12) United States Patent
Marsland

(10) Patent No.: US 6,601,110 B2
(45) Date of Patent: Jul. 29, 2003

(54) SYSTEM AND METHOD FOR TRANSLATING FILE-LEVEL OPERATIONS IN A NON-DOOR-BASED OPERATING SYSTEM TO DOOR INVOCATIONS ON A DOOR SERVER

(75) Inventor: Tim P. Marsland, Half Moon Bay, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/040,657

(22) Filed: Mar. 17, 1998

(65) Prior Publication Data

US 2001/0013074 A1 Aug. 9, 2001

(51) Int. Cl.⁷ .................................................. G06F 9/54
(52) U.S. Cl. ....................... 709/310; 707/200; 709/203; 709/328; 709/330
(58) Field of Search .................................. 709/310–320, 709/330, 200–203, 328; 710/48; 707/200–205

(56) References Cited

U.S. PATENT DOCUMENTS

| | | | | |
|---|---|---|---|---|
| 5,097,533 A | * | 3/1992 | Burger et al. .............. 395/500 |
| 5,440,744 A | * | 8/1995 | Jacobson et al. ........... 395/650 |
| 5,475,845 A | * | 12/1995 | Orton et al. ................ 395/700 |
| 5,566,302 A | * | 10/1996 | Khalidi et al. .............. 709/312 |
| 5,577,251 A | * | 11/1996 | Hamilton et al. ........... 709/101 |
| 5,619,665 A | * | 4/1997 | Emma ........................ 395/384 |
| 5,740,430 A | * | 4/1998 | Rosenberg et al. ......... 707/200 |
| 5,765,174 A | * | 6/1998 | Bishop ....................... 707/206 |
| 5,787,251 A | * | 7/1998 | Hamilton et al. ........... 709/203 |
| 6,074,427 A | * | 6/2000 | Fought et al. ............... 703/21 |
| 6,151,639 A | * | 11/2000 | Tucker et al. ............... 709/316 |
| 6,170,018 B1 | * | 1/2001 | Voll et al. ................... 709/330 |

FOREIGN PATENT DOCUMENTS

WO  WO 99/03036  * 1/1999  ............. G06F/9/46

OTHER PUBLICATIONS

Article by Hamilton et al. entitled "The Spring Nucleus: A Microkernel for Objects," Usenix Conference 1993, published Jun. 1995, pp. 147–159.

* cited by examiner

Primary Examiner—St. John Courtenay, III
(74) Attorney, Agent, or Firm—Squire, Sanders & Dempsey L.L.P.

(57) ABSTRACT

The present invention provides a system for using door translation to perform inter-process communication. The system enables a legacy application program to invoke traditional operations, such as READ and WRITE operations, which would otherwise be unavailable in a doors environment. Transparent to the client process, the system of the present invention translates the otherwise unavailable operation into a door call. Bound by its limitations and constraints, the server process performs a service in response to the door call. The system comprises a system call handler, such as a generic file system, which receives a file operation request from a client process. A door invocation handler, which includes a translator, determines the appropriate server process capable of performing a service corresponding to the operation request, translates the operation request into a door call to the server process, and invokes the door call. The server process performs its service and sends a response back via the operating system kernel to the client process.

37 Claims, 8 Drawing Sheets

Data 450

|  | UID (455) | Username (460) | TTY (465) | Time (470) | State (475) |
|---|---|---|---|---|---|
| (1) | 100 | TPM | /dev/P3 | 10:30 pm | Logged In |
| (2) | 108 | MJL | /dev/P2 | 9:30 am | Logged Out |
| (3) | 266 | ASM | /dev/P3 | 9:27 am | Logged In |
| (4) | 58 | LAR | /dev/P3 | 6:30 am | Logged In |
| (5) |  |  |  |  |  |

Read Offset 480 (after row 3)
Write Offset 485 (after row 4)

FIG. 4B

SYSTEM AND METHOD FOR TRANSLATING FILE-LEVEL OPERATIONS IN A NON-DOOR-BASED OPERATING SYSTEM TO DOOR INVOCATIONS ON A DOOR SERVER

BACKGROUND OF THE INVENTION

1. Field of the Invention

This invention relates generally to inter-process communication computer systems, and more particularly to a system and method for using door translation to perform inter-process communication.

2. Description of the Background Art

In some operating systems, a computer process, i.e., an instance of a computer program currently executing, can create additional execution entities, referred to as "threads," which become part of the computer process and which execute "concurrently" with one another. Each thread is scheduled independently for execution by the kernel. A computer process capable of having multiple threads is generally called "multithreaded." Each thread shares the address space and resources allocated to the computer process. Therefore, the memory space generally is allocated to all threads of the computer process, rather than to individual threads.

It is sometimes desirable to allow a first computer process to perform an operation without granting the authority to perform similar, but different, operations to a related second computer process. For example, it may be desirable to permit a first computer process to monitor the status of a second computer process without granting other access rights. Similarly, only a first computer process referred to as the "server process" may be permitted to perform a particular task called the "subject operation". Accordingly, the first computer process allows other computer processes referred to as "client processes" and which do not have such authority to perform the operation only within the address space of and under the authority of the server process. For example, a server process can monitor the status of various computer processes at the request of a client process, which may have no direct access to the other computer processes.

System designers at Sun Microsystems, Inc. have developed door technology to provide a relatively efficient mechanism for performing Inter-Process Communication (IPC), or more particularly for performing Remote Procedure Calling (RPC), in which a first computer process, i.e., a client process, invokes a door call which initiates the performance of a procedure defined and executed by a second computer process, i.e., the server process. The server process performs the requested operation and returns a result to the client process. Door mechanisms are described, for example, in Graham Hamilton and Panos Kougiouris, "The Spring Nucleus: A Microkernel for Objects," Usenix Conference 1993, at 147–160 (June 1995), which is incorporated herein by reference. Doors are further described in U.S. application Ser. No. 08/563,155, now U.S. Pat. No. 6,170,018, entitled "Remote Procedure Calling Using an Existing Descriptor Mechanism," filed on Nov. 27, 1995, by inventors James J. Voll, Graham Hamilton, Panagiotis Kougiouris and Steven R. Kleiman, which is also incorporated herein by reference.

Operating systems which implement door technology have processes dedicated for performing different tasks including data access operations such as READ and WRITE. Accordingly, computer programmers author application programs that apply the latest door technology to implement these data access operations. Legacy application programs which request READ or WRITE operations will fail in a doors environment. To render these legacy application programs operative, either the legacy application program must be modified to apply door calls instead of these data access operations, which is a cumbersome and time-consuming process, or a legacy operating system (i.e., one without door technology) must be used. Therefore, a system and method are needed to enable legacy application programs to operate in a doors environment.

SUMMARY OF THE INVENTION

A preferred embodiment of the present invention provides a system and method for translating simple data access operations into implicit inter-process communications between server and client processes. The system and method enable a legacy computer program to invoke traditional operations such as READ and WRITE, which would otherwise be unavailable in a doors environment. Transparent to the calling program, the described embodiment of the present invention translates the otherwise unavailable operation into a door call. Thus, the system and method may support legacy application programs and may provide programmers with a simpler programming mechanism than those required by a current door system.

A system in accordance with the present invention comprises a door file system having a translator for invoking a door call in response to an operation request received, and a server process communicating with the translator for performing a service in response to the door call. Accordingly, two new door call operations referred to as KERN_READ and KERN_WRITE have been created. Similarly, the method in accordance with the present invention translates simple data access operations into implicit inter-process communications between server and client processes. The method comprises the steps of receiving a data access operation request, and invoking a door call in response to the received operation request. It will be appreciated that the system and method advantageously enable legacy application programs to access files in a doors environment. The system and method provide programmers with a simple programming mechanism for accessing doors indirectly.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive

BRIEF DESCRIPTION OF THE DRAWINGS

FIG. 4B is a block diagram illustrating details of a specific example memory portion of FIG. 2;

DETAILED DESCRIPTION OF THE PREFERRED EMBODIMENT

The system and method of the present invention use doors to enable inter-process communication. It will be appreciated that the system and method of the present invention build upon the teachings of U.S. application Ser. No. 08/563,155, now U.S. Pat. No. 6,170,018, entitled "Remote Procedure Calling Using an Existing Descriptor Mechanism," filed on Nov. 27, 1995, by inventors James J. Voll, Graham Hamilton, Panagiotis Kougiouris and Steven R. Kleiman, which has been hereby incorporated by reference. This document teaches certain fundamentals of doors but does not teach the translation mechanisms provided by the present invention.

Figure 1:
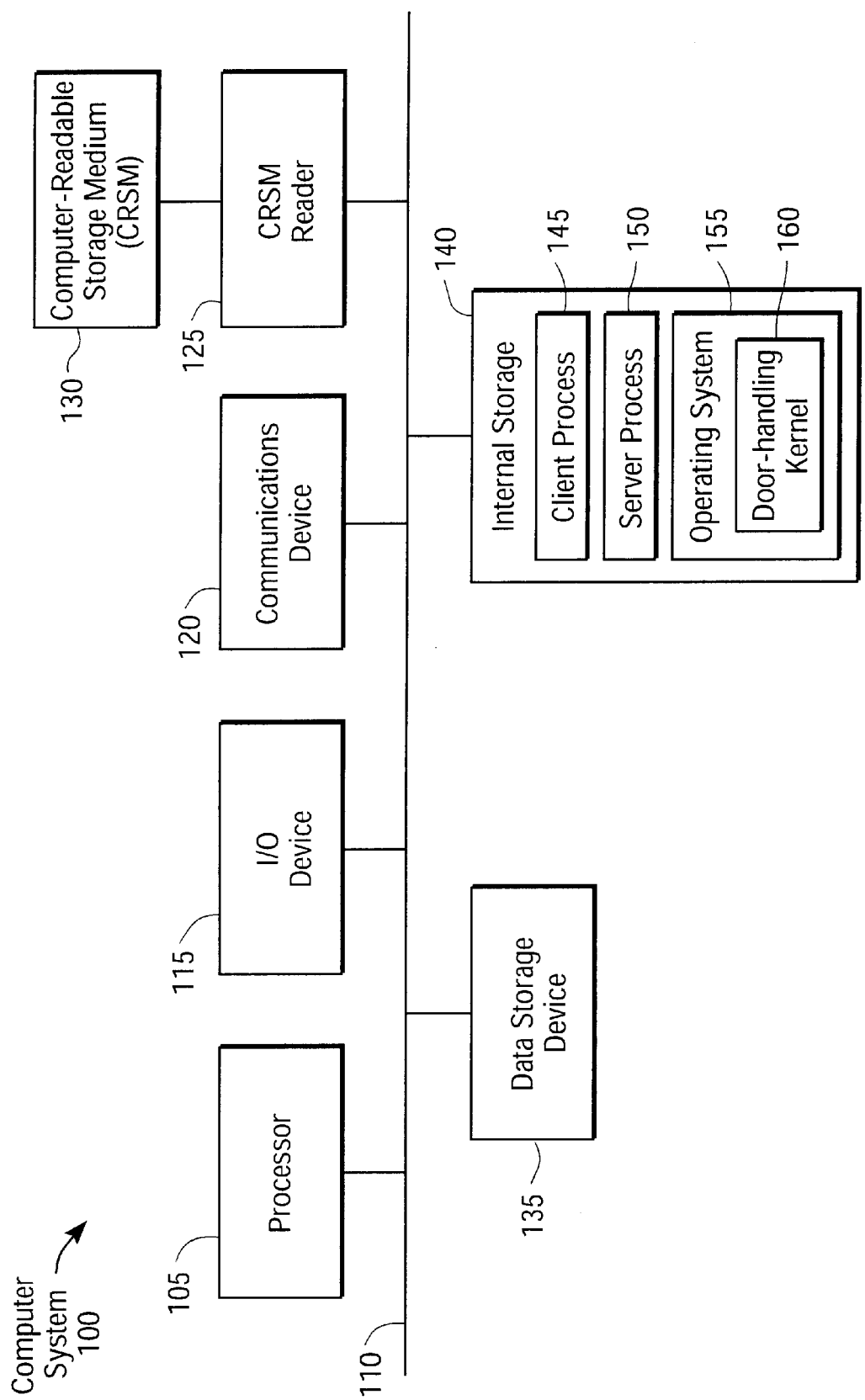
FIG. 1 is a block diagram illustrating a computer system, in accordance with the present invention.

FIG. 1 is a block diagram illustrating a computer system 100, in accordance with the present invention. The computer system 100 includes a processor 105, such as a Sun Microsystems SPARC™ processor, a Sun Microsystems cluster processor, an Intel Pentium® processor or a Motorola Power PC® processor, coupled to a signal bus 110. The computer system 100 further includes an input/output device 115 (such as a keyboard or a cathode ray tube display), a communications device 120 such as a network connection, e.g., an Ethernet port and driver, and a Computer-Readable Storage Medium (CRSM) reader 125 for reading a computer-readable storage medium 130, each coupled to the signal bus 110. The system 100 still further includes a data storage device 135 (such as a magnetic disk) and an internal storage 140 (such as random-access memory, i.e., RAM), each also coupled to the signal bus 110.

A client process 145 is a computer process that performs a predetermined task, such as enabling a user to access a network server (not shown). The client process 145 may be stored in the data storage device 135 and loaded into internal storage 140 (as illustrated) for execution by processor 105. A server process 150 performs a specific task, such as performing a READ from or WRITE to a memory location, and also may be stored in the data storage device 135 and loaded into internal storage 140 (as illustrated) for execution by processor 105. The server process 150 globally publishes the availability of its service to client processes 145 in a manner known to persons of ordinary skill in the art. The processes 145, 150 and operating system 155 can also be embodied in a carrier wave and loaded into memory via the communications device 120 from the Internet, a LAN or a WAN.

An operating system 155 enables inter-process communication between the client process 145 and the server process 150, and is typically stored in the data storage device 135 and loaded into the internal storage 130 (as illustrated) for execution. The operating system 155 includes a door-handling kernel 160, which converts conventional simple data access operations into door calls and which enables the execution of the door calls by the server process 150. A conventional simple data access operation includes any operation such as READ or WRITE that manipulates or examines data in a file. Because the system 100 uses door translation, the client process 145 is unaware that the operating system 155 has implemented a door call in lieu of, for example, a conventional READ operation. It will be appreciated that the client process 145, the server process 150 and the operating system 155 can be stored on the computer-readable storage medium 130 and loaded via the CRSM reader 125 to the internal storage 140. Although processes 145 and 150 are shown as being separate from operating system 155, processes 145 and 150 may be part of operating system 155.

One of ordinary skill in the art understands that the computer system 100 may also include additional information, such as network connections, additional memory, additional CPUs, LANs, input/output lines for transferring information across a hardware channel, the Internet or an intranet, etc. One skilled in the art will also recognize that although the client process 145, server process 150 and operating system 155 are being described as located on a single machine, these programs or portions of these programs may be located on different machines that are networked together.

Figure 2:
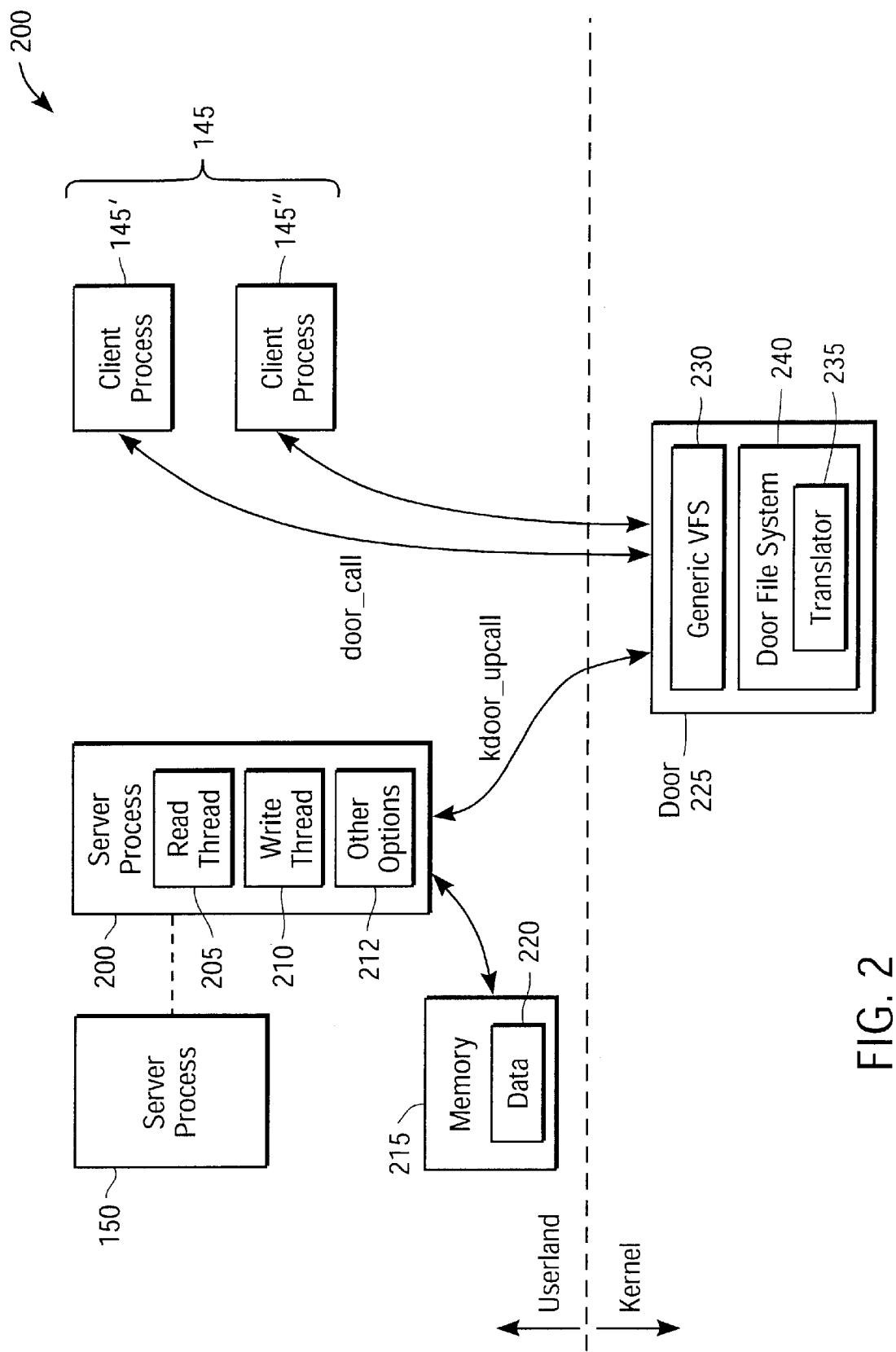
FIG. 2 is a block diagram illustrating component operations of the computer system of FIG. 1.

FIG. 2 is a block diagram illustrating operational details of the computer system 100. In general, FIG. 2 illustrates a first client process 145' and a second client process 145", each invoking a door 225 to initiate a particular server process 200. The particular server process 200 manages data 220 in memory 215 and performs tasks in response to requests made by the client processes 145.

Doors 225 are briefly described for completeness. In general, a door 225 is a portion of an operating system kernel 160 that is used to facilitate a secure transfer of control and data between a client process 145 and a server process 150. By using door 225 to invoke a Remote Procedure Call (RPC), a client process (i) transfers to the kernel 160 a buffer which contains arguments consumed by performance of the subject operation and which will contain results produced by performance of the subject operation and (ii) instructs the kernel 160 to initiate performance of the subject operation. The server process 150 creates a door 225 by creating and setting aside a thread, sometimes referred to as a "server thread," which typically exists solely for the purpose of performing the subject operation in response to a request from a client process 145. Example server threads are shown in FIG. 2 as READ thread 205 and WRITE thread 210.

When the kernel 160 invokes performance of the subject operation, the kernel 160 immediately executes the server thread. Similarly, when the subject operation terminates, the kernel 160 immediately executes the client process 145. While the client process 145 executes, the server thread is ready to execute; and while the server thread executes, the client process 145 is ready to execute. Since the kernel 160 suspends execution of one computer process immediately for execution of another, very little processing is required to transfer control from the client process 145 to the server thread and back again, in comparison to other RPC mechanisms in which the kernel 160 uses conventional computer process scheduling mechanisms to suspend execution of the client process 145 temporarily and resume execution of the server process 200. Thus, overhead associated with more complex synchronization objects such as semaphores and condition variables is avoided.

Doors 225 provide a safe Inter-process Communication (IPC) mechanism. As stated above, doors 225 are created by the server process 150 and cannot be created by the client processes 145. A server thread executes in the context of the server process 150 that created the door 225 and the server thread. Further, a thread of one computer process is generally not permitted to interfere with a thread of another computer process. Accordingly, a client process 145 can invoke a door 225 securely, i.e., without concern that execution of the subject operation in the context of the server process 150 will cause harm to the client process 145. More particularly, the subject operation retrieves the arguments from a buffer in the kernel 160, acts in accordance with the computer instructions of the subject operation, and stores results produced by execution of the subject operation in the buffer. Upon completion of the subject operation, the subject operation notifies the kernel 160 of the completion; and, in response to such notification, the kernel 160 immediately executes the client process 145 in place of the server thread as described above. Thus, by performing the subject operation and by returning processing to the client process 145, the server thread has no direct access to the client process 145.

Necessary mechanisms for door management include components for creating and destroying doors 225, for duplicating and discarding door descriptors, for invoking and returning from doors 225, for providing names by which client processes 145 can identify and invoke respective doors 225, and for providing limits on the number of doors 225 a computer process can create. Adding mechanisms to an operating system increases the complexity and resource requirements of the operating system. Since operating systems currently require substantial resources, including processor speed, memory capacity, and non-volatile storage capacity, this increase in complexity and resource requirements is significant. The remaining computer processes, including user applications which frequently perform complex calculations requiring substantial resources of their own are left with fewer resources.

Upon start-up, each server process 150 creates a corresponding server process 200 and a client-accessible door 225 to publicize an available service (such as a READ or WRITE operation). Each server process 150 may use the fattach facility to publicize the availability of its corresponding server process 200. When a client process (e.g., client process 145) invokes a door 225, the door 225 responds by causing the appropriate server thread, e.g., READ thread 205 or WRITE thread 210, of the server process 200 to initiate. The server process 200 waits to be initiated until the door 225 is invoked. It will be appreciated that each server thread 205, 210 may be created dynamically upon invocation of door 225. Accordingly, multiple instances of a server thread may be created to manage multiple requests by different client processes 145.

Upon invocation of door 225 by client process 145, the door-handling kernel 160 suspends execution of the client process 145 and initiates execution of the server process 200. The server process 200 performs its operations, which may include reading data 220 from or writing data to memory 215. The server process 200 returns a result to the door 225, which in turn returns the result to the client process 145. Upon completion of the server process 200, the door-handling kernel suspends execution of the server process 200 and initiates execution of the corresponding client process 145. It will be appreciated that the kernel 160 typically uses a scheduling object (not shown) to determine when to suspend or resume execution of client process 145 and server processes 200, each of which can execute concurrently within the computer system 100 and can share one or more computer system 100 resources. A conventional scheduling object such as a conventional semaphore or a condition variable can be used. It will be appreciated that scheduling objects are useful when one computer process has no access to state information of other processes. Scheduling objects are described in greater detail by the references incorporated herein.

Invocation of a Door

A client process 145 invokes a door 225 by performing a door call using a globally known door descriptor for the door 225, and including as arguments in the door call needed by the server process 200 to perform its service. As discussed below, the fact is that invoking a door 225 is transparent to client process 145.

In accordance with the present invention, the client process 145 invokes a door call indirectly by performing an operation that is translated to a door call. The operation may include a conventional (or legacy) data access operation such as READ or WRITE. A generic Virtual File system (VFS) in the door-handling kernel 160 gathers information needed to perform an operation requested by the client process 145, and sends the information to a door file system 240. The door file system 240 determines whether an operation is to be translated to a door call. For example, the door file system 240 uses a translator 225 (which includes a translation table) to translate otherwise unavailable operations into a door call to the server process 200 configured to perform the operation.

Figure 3:
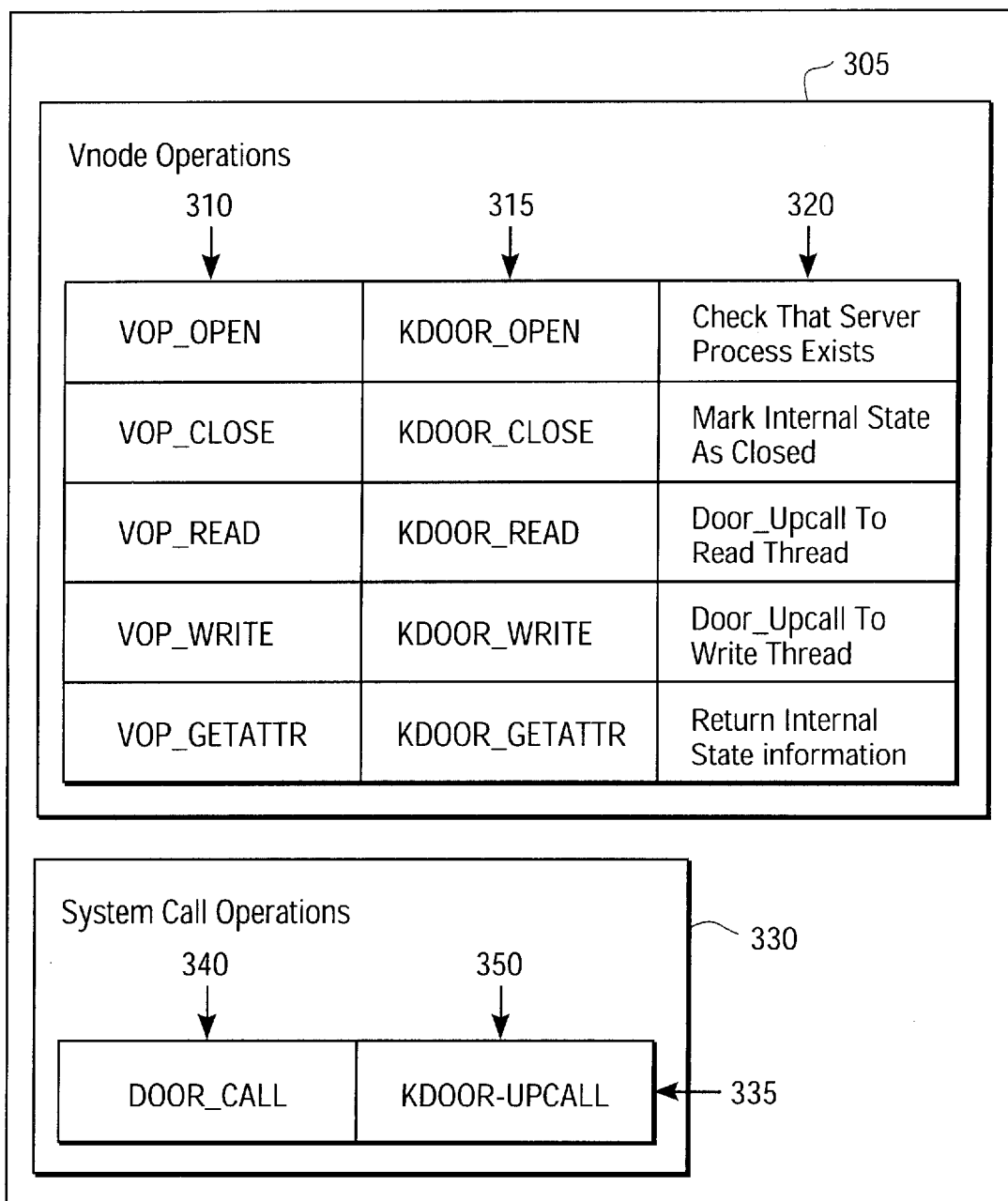
FIG. 3 is a block diagram illustrating details of the translator of FIG. 2.

FIG. 3 is a block diagram illustrating an example translator 235, which includes a vnode operations chart 305, including all available legacy operations 310, new door calls 315 and door upcalls 320 to the server process 200. For example, the door file system 240 indicates that a legacy READ operation (shown as "VOP_READ") 310 is to be translated to a KDOOR_READ door function call 315, which in turn is to be translated to a door upcall to a READ thread 205. A legacy operation 310 may include, in addition to the operation itself, a set of memory addresses which only the server process 200 is authorized to access. When the door file system 240 recognizes that an operation in the client process 145 matches a legacy operation 310, the translator 235 uses the vnode operations chart 305 to convert the legacy operation 310 to a new door call 315. The door file system 240 executes the new door call 315, by converting the new door call operation 315 to a door upcall 320 to the server process 200. The generic VFS 230 and the door file system 240 operate similarly for WRITE operations to particular memory locations. It will be appreciated that operation-to-door_upcall translation includes argument translation, which is described in detail with reference to FIGS. 5–7.

Translator 235 may also support system call operations 330 as described in the references incorporated herein. That is, upon recognition of a conventional door call 340, the translator 235 uses a system operations chart 335 to translate the conventional door call 340 to a conventional door upcall (kdoor_upcall).

Figure 4A:
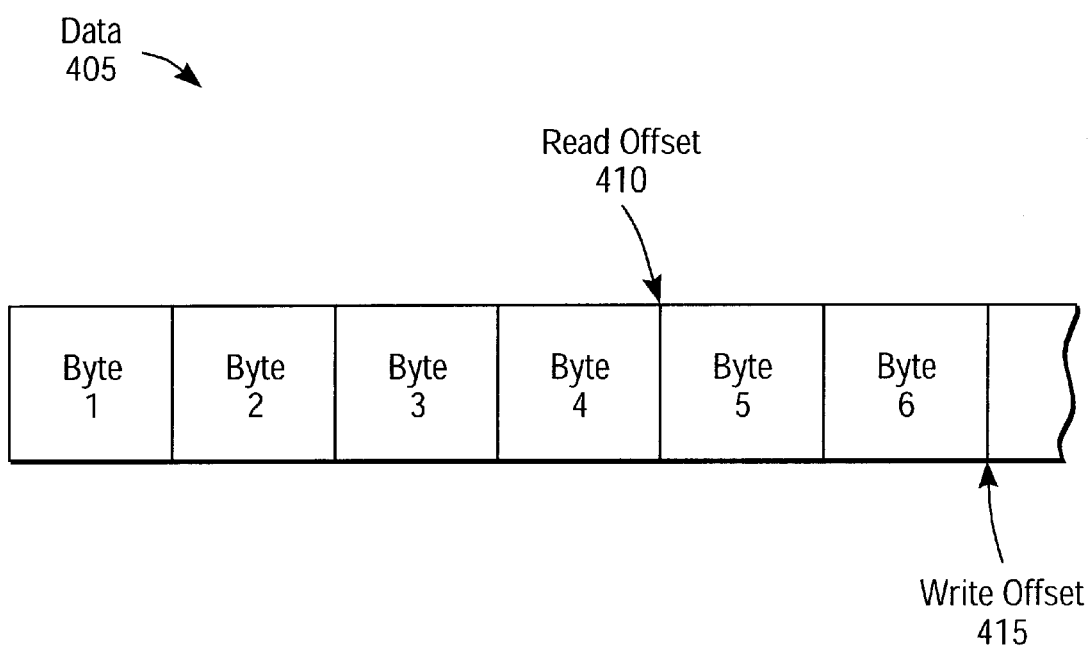
FIG. 4A is a block diagram illustrating details of a memory portion of FIG. 2.

FIG. 4A is a block diagram illustrating sample data 405 of data 220, which is stored in a portion of memory 215. The sample details 405 include a multiplicity of data bytes, shown as bytes 1–6. The sample details further include a current READ offset pointer 410, which identifies the byte to be accessed by the READ server process 200 upon the receipt of a next translated READ operation, and a current WRITE offset pointer 415, which identifies the byte to be written to by the WRITE server process 200 upon the receipt of a next translated WRITE operation. It will be appreciated that the READ and WRITE memory offset pointers 410 and 415 are maintained by the generic VFS 230. For example, the server process 200 may read from and write to memory locations in the memory 215 based on a dedicated file identifier and a current offset pointer in the client process 145.

FIG. 4B is a block diagram illustrating specific example data 450 of data 220, which is stored in a portion of memory 215. Specific example data 450 includes four records of user information, wherein each record includes a user identification ("uid") 455, a username 460, a computer terminal address ("tty") 465, a time stamp ("time") 470, and a state flag ("state") 475. For example, the first record, labeled as "(1)," includes the user identification "100," the username "TPM," the terminal address "/dev/p3," the time stamp "10:03 pm," and the state flag "Logged In." The specific example data 450 includes a READ offset 480 pointing at record four "(4)" and a WRITE offset 485 pointing at an empty record "(5)."

As described in the references incorporated herein, it will be appreciated that the server process 200 may offer other data access capabilities such as a search function based on specified criteria. That is, another thread (not shown) may be able to invoke a search_by_name operation for example to search the data 450 for the usernames of all user that are currently logged into the system 100 (i.e., those that have state flags 475 equal to "Logged In."). Another thread (not shown) may be able to invoke a search by attribute operation for example to retrieve the usernames of all the users who can log into the system 100 (i.e., those that are listed in the data record 450).

However, using translation, the client process 145 treats the database as a file, e.g., requests to READ an amount of data at a certain offset, but the server process 200 operates like an application program interface that performs the requested operation more efficiently. That is, although the client process 145 makes a conventional READ request, the translator 235 translates the request into a door call to the READ thread 205. The READ thread 205 of the server process 200 performs application-like services to emulate the conventional READ request, thereby making the translation transparent to the client process 145.

It will be appreciated that the data 450 may include the contents of the conventional UNIX accounting file, e.g., the UTMP file as shown in the example of FIG. 4b. Because legacy application programs expect READ and WRITE access to the UTMP file, while newer application programs use explicit Application Program Interfaces (APIs) to access the file, access must be synchronized cleanly. By using door translation, synchronization may be achieved. Further, efficient access to UTMP data critical for many user systems. When the database is located in the address space of a single server process 200 and is accessed by hashing techniques, user applications can search the database rapidly. Other files that have similar access requirements include files relating to device driver configuration, e.g., /etc/name_to_major and /etc/minor_perm, in the face of hotplugging or files that relate to updates to the mount table/etc/mnttab.

Figure 5:
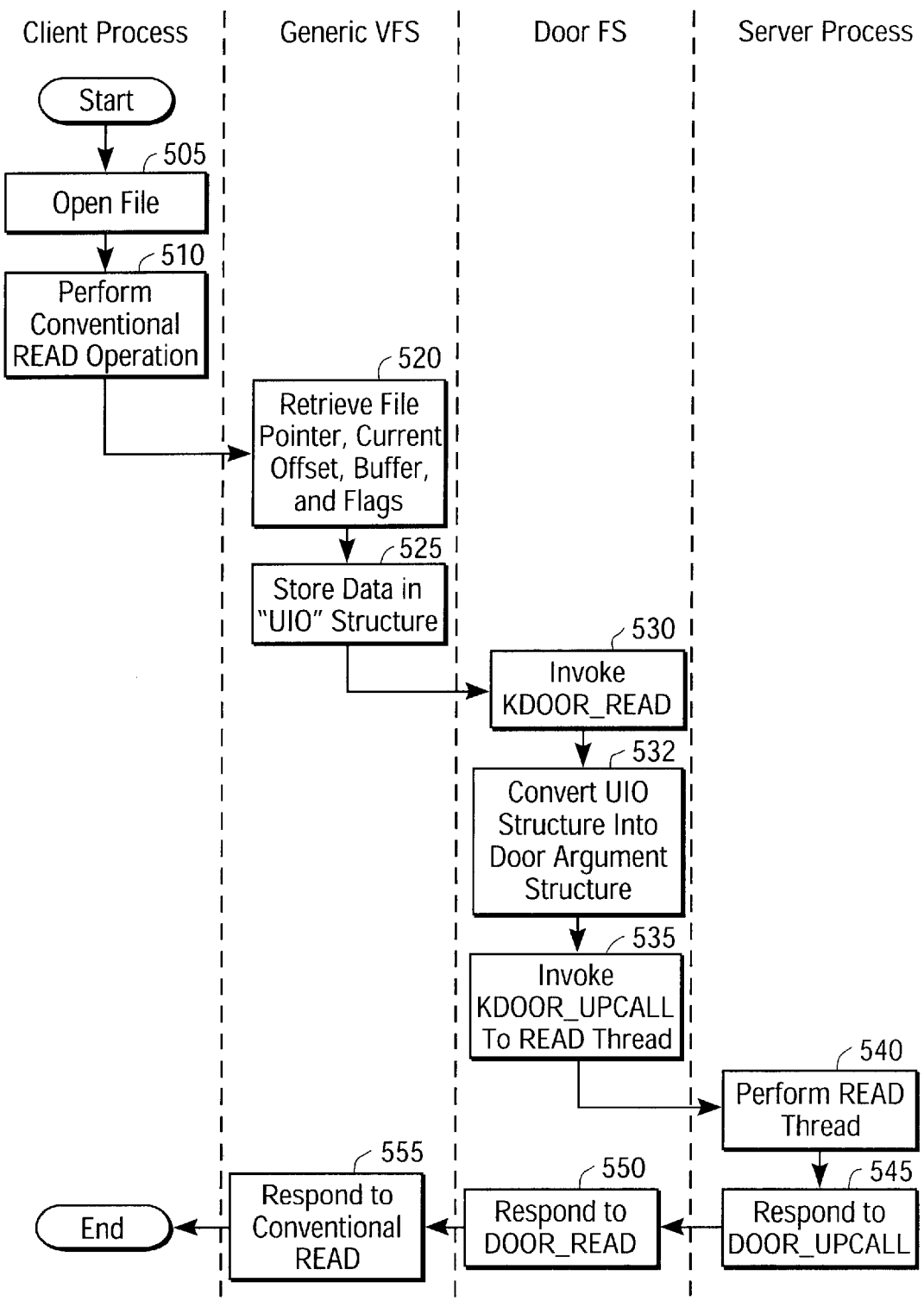
FIG. 5 is a flowchart illustrating a method of using door translation to perform inter-process communication, in accordance with the present invention.

FIG. 5 is a flowchart illustrating a method 500 of using a door translator 235 to perform inter-process communication. Although FIG. 5 is described with reference to conventional READ operation (VOP_READ), other simple data access operations may alternatively be used. Method 500 begins with the client process 145 in step 505 opening a file and in step 510 performing a simple data access operation such as a conventional READ operation. A conventional READ operation may be formatted as follows:

READ (d, size, offset, buffer, flags)     [1]

where "d" identifies the file, "size" indicates the amount of data to read, "offset" indicates the location within the file from which to read, "buffer" addresses the memory location in which to store the data, and "flags" indicate status, etc. As shown in FIG. 3, the VOP_OPEN call causes the translator 235 to check that server process 200 exists (not shown in FIG. 5). The client process 145 waits for a response from the kernel 160. The conventional operation is a function call to the generic VFS 230, which in step 520 retrieves the file pointer d, offsets, buffer and flags, and in step 525 stores the arguments in a user input/output (uio) structure. Control passes to the translator 235 in the door File System (FS) 240.

The door FS 240 in step 530 recognizes the VOP_READ and responsively invokes a KDOOR_READ operation. The door FS 240 in step 532 converts the uio structure into a door argument structure, and in step 535 invokes a KDOOR_UPCALL operation to the READ thread 205. A KDOOR_UPCALL operation may be formatted as follows:

KDOOR_UPCALL (PID, KERN_READ, door arguments)     [2]

where "PID" identifies server process 200, "KERN_READ" identifies the thread in server process 200 to invoke, and "door arguments" include the READ arguments identifying the file, the size, the buffer and the offset. "Door arguments" may also include a vnode pointer and flags. Converting a simple data access operation into a door file system operation is described in greater detail with reference to FIG. 6.

The READ thread 205 of the server process 200 in step 540 performs its service, e.g., performs the requested READ operation by retrieving the specified data 220 from memory 215 using the information from step 520. The READ thread 205 in step 545 responds to the DOOR_UPCALL by sending a response (including status information) to the door FS 240. Operations of the READ thread 205 are described in greater detail with reference to FIG. 7. The door FS 240 in step 550 responds to the KDOOR_READ by sending an appropriate response (including status information) to the generic VFS 230. In turn, the generic VFS 230 in step 555 responds to the conventional READ request by sending an appropriate response (including status information) to the client process 145. Method 500 then ends.

Figure 6:
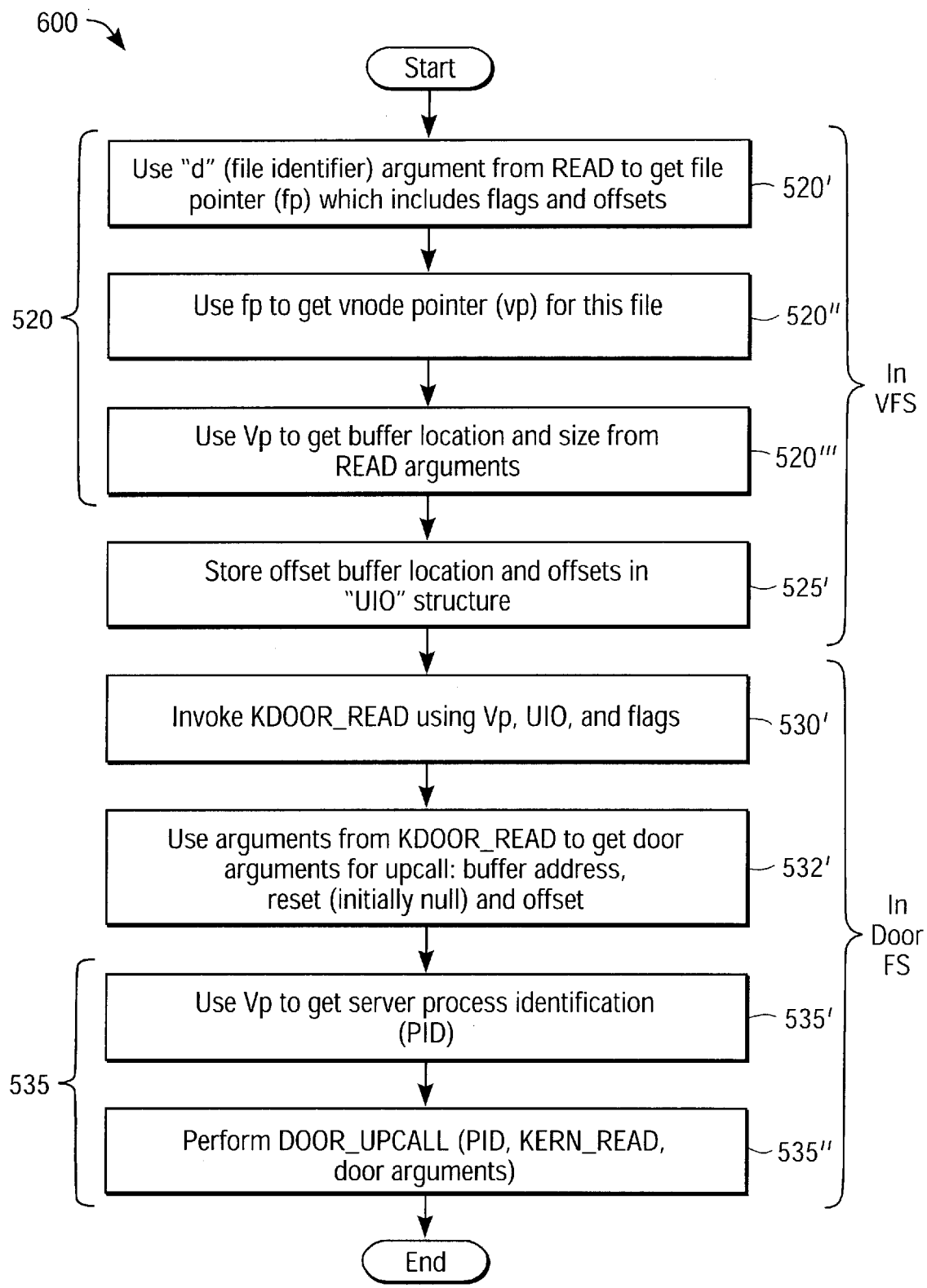
FIG. 6 is a flowchart illustrating details of the FIG. 5 steps of converting a conventional READ operation to a DOOR_UPCALL operation.

FIG. 6 is a flowchart illustrating a method 600 of converting a simple data access operation to a door upcall. Although FIG. 6 is being described with reference to a conventional READ operation, one skilled in the art will recognize that other simple data access operations, such as WRITE, can alternatively be used. It will be appreciated that the FIG. 6 steps identified by primed numbers may be included in the FIG. 5 steps identified by the like unprimed number. Method 600 begins with the generic VFS 230 in step 520' using a file identifier argument "d" from the conventional READ request to get a file pointer (fp), which references flags and current offsets, for the specified file. The generic VFS 230 in step 520" uses the file pointer (fp) to get a vnode pointer (vp) for the specified file, and in step 520'" uses vp to get the buffer location and size arguments for the data being requested. It will be appreciated that step 520 of FIG. 5 may include steps 520', 520" and 520'" of FIG. 6. The generic VFS 230 in step 525' stores the data in a "uio" structure.

The door FS 240 in step 530 invokes the KDOOR_READ operation using vp, the uio structure and flags. The door FS 240 in step 532' uses the arguments from the KDOOR_READ, e.g., the buffer address, result (initially null), and offset, to get the arguments for the door upcall. The door file system 240 in step 535' uses vp to get server process identification (server PID), which identifies the READ thread 205. The door file system 240 in step 535" performs the door upcall using the door arguments PID, KERN_READ and door arguments. It will be appreciated that the function name KERN_READ indicates that the original request was a conventional READ operation, and indicates to the server process 200 to select the corresponding READ thread 205. It will be further appreciated that the FIG. 5 step 535 may include the FIG. 6 steps 535' and 535". Method 600 then ends.

Figure 7:
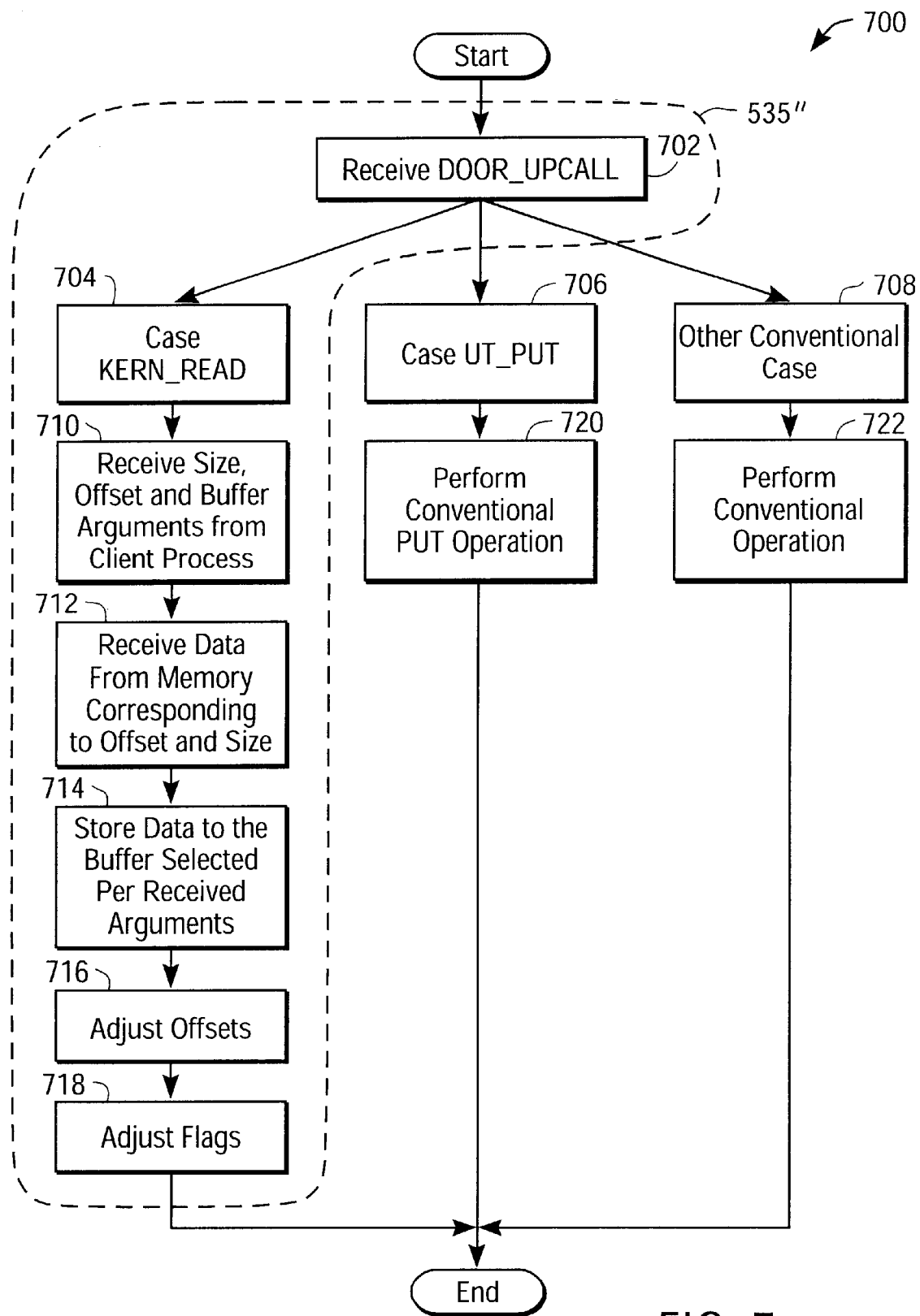
FIG. 7 is a flowchart illustrating details of FIG. 5 step of performing a READ operation.

FIG. 7 is a flowchart illustrating details of a method 700 for a thread of a server process 200, e.g., the READ thread 205, to perform a service in response to a door call. Again, although FIG. 7 is being described with reference to a READ operations, one skilled in the art will recognize that other simple data access operations may alternatively be used. Method 700 begins with the server process 200 in step 702 receiving a door upcall, and determining the door call type, e.g., a READ type (KERN_READ) 704, a PUT type (UT_PUT) 706, or other conventional case 708. Note that, in the described embodiment, conventional OPENS, CLOSES, and GET_STATUS calls are handled by the door FS 240 as shown in FIG. 3 and do not result in an upcall to the server process 200.

In the case where the door call is a READ type 704, the READ thread 205 in step 710 receives the door upcall arguments including size, offset and buffer address. The READ thread 205 in step 712 retrieves the requested amount of data 220 from the specified memory locations corresponding to the offset and size arguments. The READ thread 205 in step 714 stores the data 220 to the buffer corresponding to the buffer address in the door call argument. The READ thread 205 in step 716 adjusts the READ offset 410 by incrementing the offset in accordance with the number of bytes read, and in step 718 adjusts the status flags 475. Method 700 then ends.

In the case where the door upcall is a PUT type 708, the server process 200 in step 710 performs a conventional PUT process and then ends. In the case where the door upcall is of another conventional case 708, the server process 200, i.e., the other options 212, performs a conventional process and then ends. It will be appreciated that method 700 operates in a similar manner for a KERN_WRITE.

The foregoing description of preferred embodiments of the present invention is by way of example only, and other variations and modifications of the above-described embodiments and methods are possible in light of the foregoing teaching. For example, although the system and method have been described with reference to conventional READ operations, any operation can be converted into a door call in view of the teachings of the present invention. Components of this invention may be implemented using any appropriate programmed general purpose digital computer, using application specific integrated circuits, or using a network of interconnected conventional components and circuits. The embodiments described herein are not intended to be exhaustive or limiting. The present invention is limited only by the following claims.

What is claimed is:

1. A method performed by a non-door-based operating system of responding to a file-based operation request made by a first process that is not door-based, comprising:
   receiving the file-based operation request from the first process;
   translating the file-based operation request to a door call, without the knowledge of the first process;
   invoking the door call for a second process that is running on a door-based server and is capable of performing a function specified by the translated operation request; and
   returning the result of the translated operation to the first process, wherein from the viewpoint of the first process the operation is performed on a regular file without any knowledge of involvement of a door-based server or a door-based process.

2. The method of claim 1, wherein translating includes translating the operation request to the door call by way of a data structure stored in memory of a data processing system.

3. The method of claim 2, wherein the data structure includes a translation table in the memory of the data processing system.

4. The method of claim 2,
   wherein the operation request includes operation arguments and the door call requires door call arguments;
   further comprising converting the operation arguments to the door call arguments.

5. The method of claim 1, wherein the operation request includes a data access operation request.

6. The method of claim 1, wherein the first process includes a client process.

7. The method of claim 1, wherein the second process includes a server process.

8. The method of claim 1, wherein the operation request includes a READ operation request.

9. The method of claim 8, wherein the door call is directed to a READ thread in a server process.

10. The method of claim 1, wherein the operation request includes a WRITE operation request.

11. The method of claim 10, wherein the door call is directed to a WRITE thread in a server process.

12. The method of claim 1, wherein the first process includes a legacy process incapable of invoking door calls.

13. The method of claim 12, wherein the data processing system includes a door file system.

14. The method of claim 1, further comprising:
   using a server thread to receive the door call.

15. The method of claim 1, wherein the first and second processes are located in the same data processing system.

16. The method of claim 1, wherein the first and second processes are located in different data processing systems.

17. The method of claim 1, wherein the first process also contains at least one door call.

18. The method of claim 1, wherein the first process does not contain any door calls.

19. A system for responding to an operation request by a non-door-based operating system, comprising:
   a translator for receiving an operation request from a file-based client process, and translating the operation request into a door call without the knowledge of the client process;
   a door invocation handler coupled to the translator for invoking the door call; and
   a door-based server process coupled to the translator for performing a service equivalent to the operation requested by the non-door-based operating system in response to the door call.

20. The system of claim 19, wherein
   the operation request includes operation arguments and the door call requires door call arguments; and
   the translator converts the operation request to a door call by converting the operation arguments to the door call arguments.

21. The system of claim 19, wherein the operation request includes a data access operation request.

22. The system of claim 19, wherein the door call is addressed to a thread in the server process.

23. The system of claim 19, wherein the operation request includes a READ operation request.

24. The system of claim 23, wherein the server process includes a READ thread.

25. The system of claim 19, wherein the operation request includes a WRITE operation request.

26. The system of claim 24, wherein the server process includes a WRITE thread.

27. The system of claim 19, wherein the client process includes a legacy process incapable of invoking door calls.

28. The system of claim 27, wherein the translator includes a data structure stored in a memory of a data processing system for translating the operation request to a door call.

29. The system of claim 28, wherein the data structure includes a translation table.

30. The system of claim 29, wherein the translation table contains operation requests and corresponding door calls; and the translator selects the door call that corresponds to the operation request.

31. The system of claim 19, wherein the translator is part of a door file system in an operating system.

32. The system of claim 19, wherein the client and server processes are located in the same data processing system.

33. The system of claim 19, wherein the client and server processes are located in different data processing systems.

34. The system of claim 19, wherein the client process contains at least one door call.

35. The system of claim 19, wherein the client process contains no door calls.

36. A computer-readable storage medium storing program code for causing a computer to perform:

receiving a file-based operation request from a file-based first process;

translating the operation request to a door call; and invoking the door call for a door-based second process capable of performing a door-based function specified by the operation request without the knowledge of the first process.

37. A signal embodied in a carrier wave for causing a processor to perform:

receiving a file-based operation request from a file-based first process;

translating the operation request to a door call; and invoking the door call for a door-based second process capable of performing a door-based function specified by the operation request without the knowledge of the first process.

* * * * *